Jan. 29, 1963    HANS-JOACHIM DIETZSCH ET AL    3,075,241
MULTIPLE HOLE SPINNING NOZZLE AND PROCESS OF MANUFACTURE
Filed March 8, 1956                              7 Sheets-Sheet 4
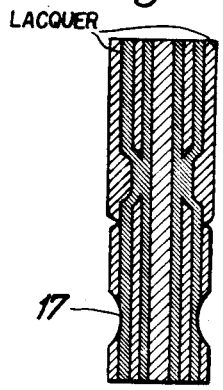
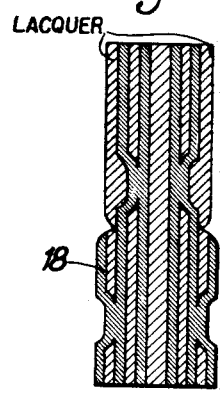
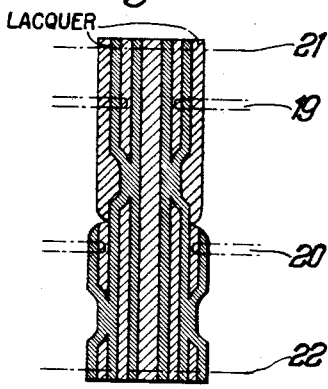
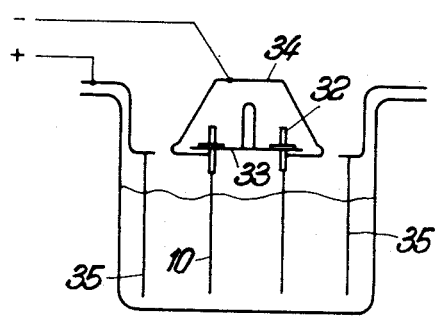
Inventors
HANS-JOACHIM DIETZSCH
& OTTO DIETZSCH
By Young, Emery & Thompson
Attys.

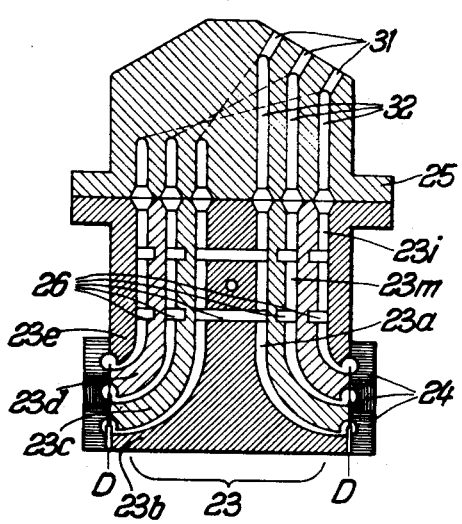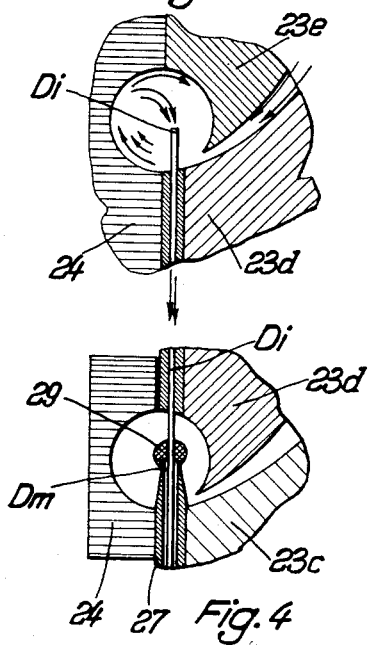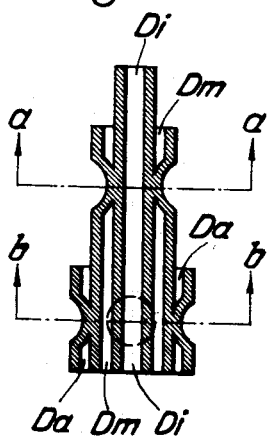

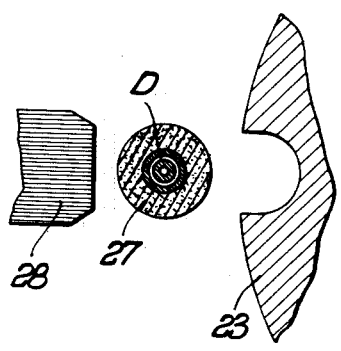
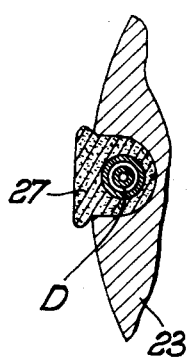
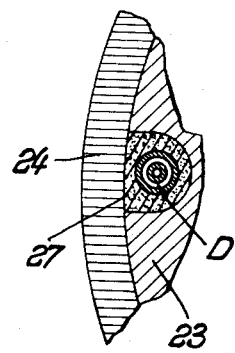
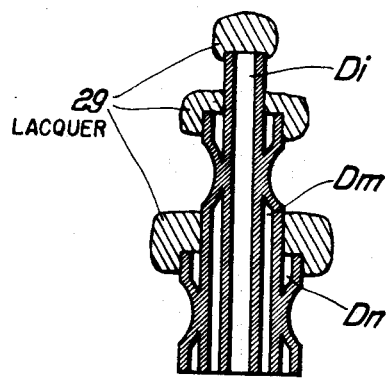
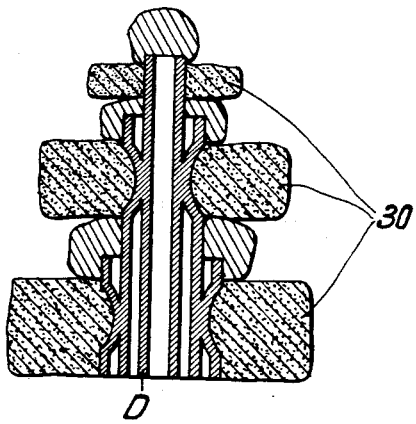

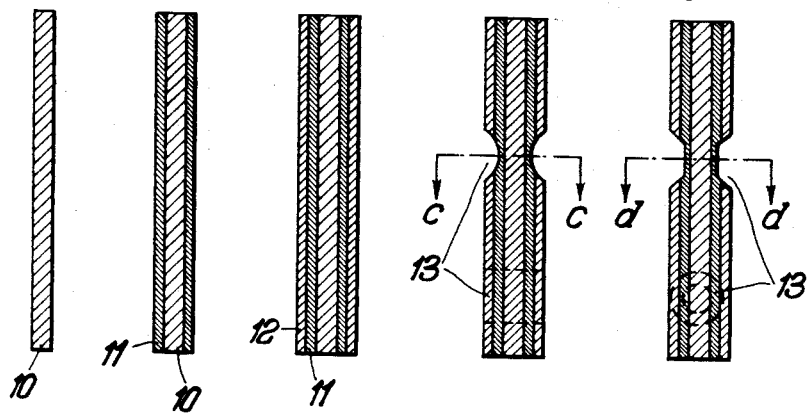
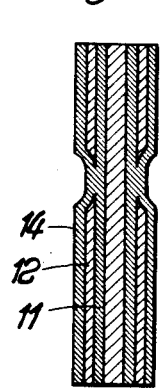
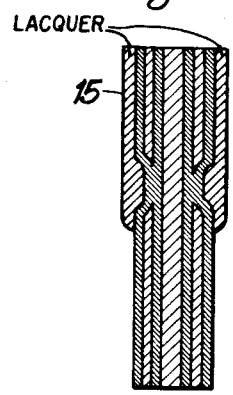
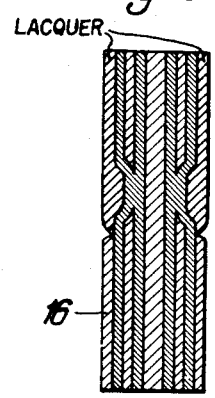

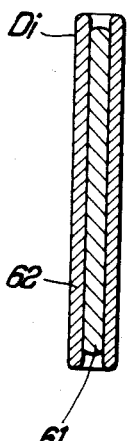
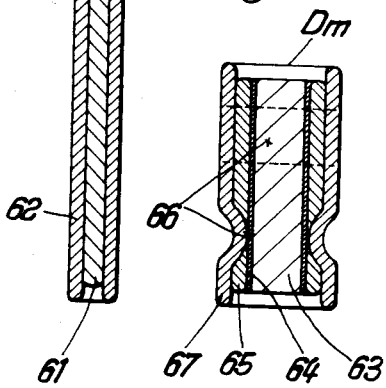
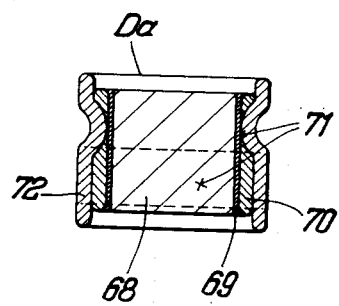
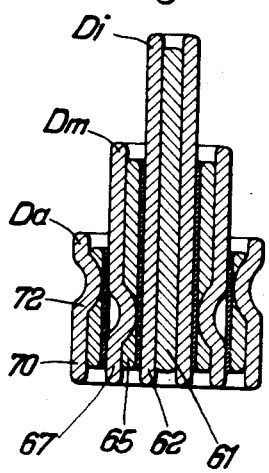
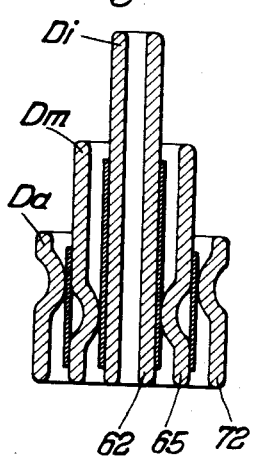
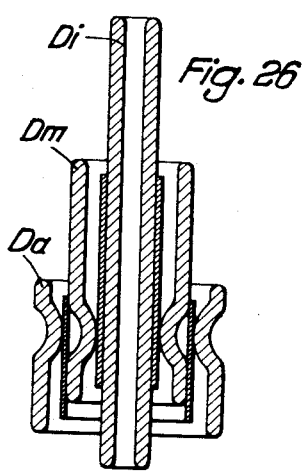

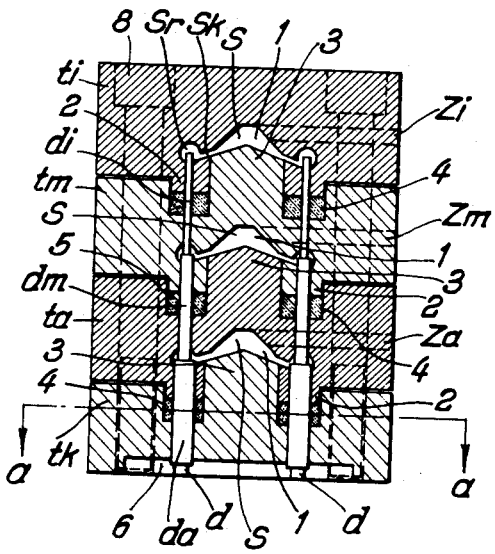
Fig. 27 b-b
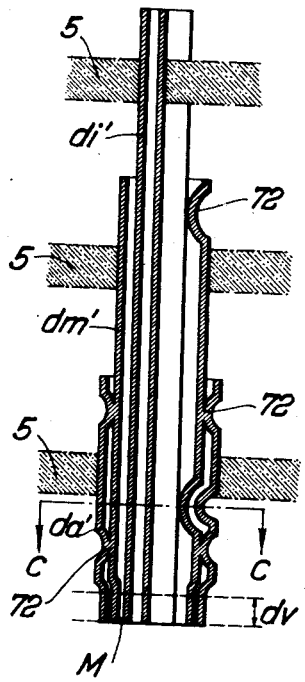
Fig. 34 d-d
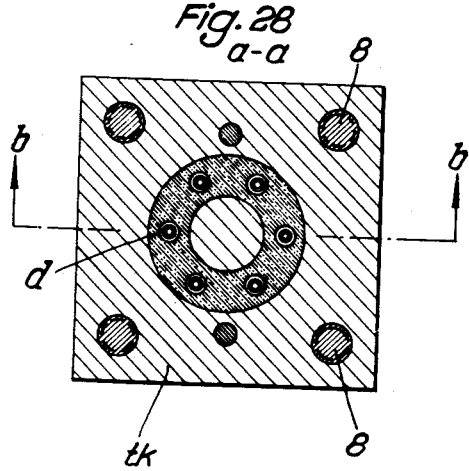
Fig. 28 a-a
Fig. 35 c-c
Inventors
HANS-JOACHIM DIETZSCH
& OTTO DIETZSCH
By Young, Emery & Thompson
ATTYS.

Jan. 29, 1963  HANS-JOACHIM DIETZSCH ET AL  3,075,241
MULTIPLE HOLE SPINNING NOZZLE AND PROCESS OF MANUFACTURE
Filed March 8, 1956  7 Sheets-Sheet 7

Inventors
HANS-JOACHIM DIETZSCH &
OTTO DIETZSCH
BY Young, Emery + Thompson
ATTYS.

United States Patent Office 3,075,241
Patented Jan. 29, 1963

3,075,241
MULTIPLE HOLE SPINNING NOZZLE AND
PROCESS OF MANUFACTURE
Hans-Joachim Dietzsch, Horn, and Otto Dietzsch, Wangen, Germany, assignors to Trikotfabriken J. Schiesser A.G., Radolfzell (Bodensee), Germany
Filed Mar. 8, 1956, Ser. No. 570,401
Claims priority, application Germany Mar. 8, 1955
13 Claims. (Cl. 18—8)

This invention relates to a multiple-hole or apertured tool for making elongated bodies having different cross sections. Such body may consist of any inorganic, for instance, metallic, or organic, such as a high molecular material, and may have any cross section, such as a thread or band-like configuration.

An example for such elongated body is a filament, the core of which consists of a certain metal and is surrounded by a sheath of another metal or of glass, enamel, or similar material. Primarily, the invention is concerned with the manufacture of synthetic fibers which have the multi-layer structure of natural fibers upon which, as is known, numerous favorable characteristics of the natural fibers are based which are still lacking in the synthetic fibers heretofore known.

The present invention provides a multi-spinning nozzle of comparatively simple construction with high safety of operation and of small size, in which the described disadvantages of hitherto known devices are avoided. The invention comprises a multi-spinning nozzle in which feeding chambers for the spinning liquids are arranged adjacent one another in axial direction in the spinning nozzle body or head to produce composite or hollow fibers.

It is a primary object of the invention to provide multi-stage nozzle bodies built and sealed into the partitions of the feeding chamber, the nozzle tubes of said spinning nozzle being inserted in one another and terminating at the one end practically in a common discharge plane, namely, the plane of the nozzle ends, while the other ends of the nozzle tubes end in their respective feeding chambers and are integrally interconnected at least in one intermediate zone.

The multi-stage nozzle bodies may consist according to the invention, of a plurality of concentric tubes having cylindrical walls. It is also possible to provide a plurality of nozzle tubes within an annular pipe or around an axial core nozzle.

It is possible to produce with such multi-nozzle bodies elongated bodies of the kind described, the cross section of these bodies consisting of zones of different materials derived from the various feeding chambers. The term "spinning" denotes in this specification only a short word for the all embracing principle of the plastic working or shaping of materials under pressure or tension, e.g., besides "spinning" in the narrow technological sense, it comprises also the processes of extrusion pressing-or drawing, of injection molding or pressure casting, etc. The multi-nozzle body, according to the invention, furthermore, makes possible to individually treat the strand of the material discharging from the core opening of a nozzle group by means of liquid or gaseous agents, said liquid or gaseous agents discharging from the annular bores of the nozzle group. According to the invention, it is possible to incorporate a liquid or gaseous core in a solidifying material discharging from the annular bores. For example, in the former instance, special surface properties of a chemical or physical nature may be obtained while, in the latter instance, hollow fibers may be made. For example, the exterior surface may possess socalled antistatic properties, i.e., may not become electrically charged by friction, as is the case with many known synthetic fibers. The fibers may also possess a dyestuff affinity, that is, they are easily susceptible to a dye. The term "bore" is not meant to be a limitation in regard to the process of manufacture.

It is another object of the invention to extend the free ends of the core nozzles beyond the annular nozzle to such an extent and to make them resilient so that these ends can carry out transversal and/or rotational oscillations. To produce such oscillations, mechanical and particularly electro magnetical oscillators of known design are used, said oscillators being arranged on the nozzle assembly or in a surrounding medium, as for instance, in a setting bath. With the use of such oscillating nozzles, crimped fibers can be produced.

The multi-stage nozzle bodies of a special design are inserted and sealed in a supporting body having several preformed parts containing the feed chambers. In one embodiment of the invention, the supporting body comprises parts which are practically concentrically arranged with respect to one another, e.g., a central base body and a surrounding body made of several parts. The supply lines of the spinning material to the various feed chambers or nozzle tubes are preferably located in the base body. Another embodiment comprises a carrier body made of several, structurally like parts which are arranged adjacent one another in axial direction, whereby the feeding chambers are left free between them. The two just described embodiments differ only in that, in the former embodiment, the carrier body is essentially designed like a symmetrical shell, and in the latter embodiment, it is formed symmetrical in axial direction. The second embodiment is preferable for the following reasons: First, the parts of the supporting body arranged adjacent one another in axial direction have substantially the same form, whereby manufacture and storing are simplified and the adaptability is increased to complex nozzles with a lesser or greater number of nozzle tubes. Furthermore, the sealing between the individual feeding chambers is facilitated and obtained with greater safety. For this purpose, a special structure is preferably used, in which the supporting parts engage one another snugly, at least in the penetration zone of the nozzle tube and hold a deformable packing or gasket between them in this zone. This deformable packing or gasket may be a preformed body of resilient material, for example, of soft metal. In special cases, this soft sealing material may be electrolytically applied on the nozzle wall at the sealing zone and may consist, for example, of porous soft gold. It is also possible to introduce the sealing material in the sealing chamber first in an unshaped or in a roughly preformed condition and then to cause the sealing material to fill out the free sealing cross section by softening or liquefying the sealing material. Such method is particularly advantageous in case of nozzle bodies having a plurality of members. Thus, this deformable sealing member engages two supporting portions and the nozzle body in the penetrating zone of the nozzle tubes, so that, during the final closing of the multi-hole spinning nozzle, all of the sealing portions are pressed simultaneously in all of the depressions to be sealed. The axial length is somewhat shortened during the closing of the multi-hole spinning nozzle, particularly, in the case of a sealing material which is deformable to a greater extent. This may cause a buckling action on the nozzle body portion between the two clamping sealing zones. Therefore, according to a further object of the invention, the nozzle body is constructed in such a manner that its length in the longitudinal direction can be varied in the zone between two sealing members adjacent one another in axial direction. For example, it is sufficient to design the nozzle body in this zone with slightly helically shaped walls, because the axial deformation is extremely small. Furthermore, the outer wall of the nozzle body is reenforced in the zone of the gasket to prevent the pressure exerted on the deformable gasket acting on the enclosed nozzle body in radial direction to subject the latter to dangerous buckling forces. Such protection may be obtained by a suitably reenforced metal layer or the like.

It is a still further object of the invention to provide a method for manufacturing such multi-hole nozzle bodies with more than one feed chamber and geometrically fixed nozzle arrangement and shape. As mentioned in the foregoing, a suitable operation in the manufacture of such nozzle bodies is the dissolving of metal filaments from the initially solid nozzle body.

Therefore, it is another important object of the invention to provide a method for making multi-hole spinning nozzle bodies by longitudinally joining materials of different strength in a controlled manner to form a solid block and by locally removing portions from this block also in a controlled manner.

A still further object of the invention resides in applying electrolytically several dense layers one after the other to a, preferably wire-shaped, body of a metal of low chemical resistance, for example, of copper, silver, or the like, said layers alternately consisting of a metal of high chemical resistance, such as rhodium, hard gold, hard chromium, or the like, and a metal of lower chemical resistance, for example, copper, silver, or the like, whereby each of the metal layers having low resistance is removed in the form of narrow metal segments, so that, during the application of the next metal layer of high resistance, integral joints are formed with the preceding metal layer of high resistance at these locations after the application of the last high resistance layer, each of the metal layers of high resistance is divided, for example, by cutting, somewhat above its uppermost joint and the low resistance material is chemically removed to free the interior nozzle channels and separate the cut-off upper portions of the metal layers of high resistance.

In place of metal as structural material for the nozzle bodies, other inorganic or organic materials may be employed, such material having a different resistance characteristic with respect to molding, obtained by mechanical, thermic or chemical operations.

In place of an electrolytic metalization, any other metalization method resulting in a dense layer may be used, for example, the socalled Schoop metal spraying process, metal evaporation, particularly in high vacuum, metal depositions by thermic disintegration of nonstable metal alloys, such as hydrites, carbonyls, etc.

Obviously, the metallic parts of the new device, in particular of the nozzles, may be refined by a suitable metallurgical method or, subsequently, influenced in any manner with respect to their qualities.

The metal of low resistance can be removed from the narrow joining areas by any of the methods known in metal working. For example, a cutting tool, such as a turning tool, a rotating wire lined with grinding particles, or the like, may be employed. The metal may be removed thermically, for example, by locally melting the metal or chemically, such as by local etching.

Since the high resistance material which is above the separation point is wasted, the nozzle can be made according to the invention in a more economical manner by covering, prior to the application of the second and each of the further high resistance metal layers, each preceding metal layer with an insulating layer. Each of these insulating layers starts slightly closer to the nozzle tip with respect to the preceding layer, so that each of the succeeding metal layers of higher resistance will be correspondingly shorter in axial direction. Finally, the insulating layer is removed.

It is still another object of the invention to modify the manufacture of a multi-stage nozzle of alternating low and high resistance metal layers, particularly in case of nozzles of larger open cross section, by designing each nozzle stage as a separate structural unit made of a low resistance core of suitable diameter having radially staggered grooves on the surface and a tubular enclosure of high resistance material surrounding the core surface and then to centrally open up the unit by removing the core material so that the next nozzle stage can be inserted and fitted as precisely as possible. After the insertion of all of the nozzle stages, the multi-stage nozzle is built into a carrier body, and finally, the rest of the low resistance material is removed.

In order to limit the removal of the core material to the desired free cross section, a core of an interior, specifically low resistance core, for example, a suitably dimensioned silver wire, having an outer layer corresponding to the desired depth of the grooves, is selected, said outer layer being made of a material having different resistance properties. For example, an electrolytically applied nickel layer may be used which will be removed in the zone of the grooves. In order to limit the removal of the material to the outer layer, a separation foil of suitable resistance properties, for example, of hard chromium, is provided between the inner and the outer core layers. From the core structure described in the foregoing, the silver may be removed, for example, by anodic electrolysis in an alkaline cyanide bath against which nickel is stable, while it can be dissolved, for example, by means of hot nitric acid. The separation foil is not disturbing, due to its extreme thinness, and, therefore, may remain within the finished multi-nozzle.

If cutting operations are used, the zones freed for the subsequent preparation of joints are combined, according to a further development of the invention, to form a groove or notch running in axial direction in form of a helix. Such method facilitates the manufacture of the nozzle insofar as the required fine adjustment of the depth action of the working tool has to be carried out only once and the metal may be continuously removed thereafter along the axis, while this adjustment remains unchanged.

As a result of the provision of the helical groove the joints formed between the nozzle tubes during the subsequent application of the next layer of high resistance high material results, likewise, in a rib running helically in axial direction. This has the further advantage in the operation that, within the nozzle tube, only controlled turbulences, if any, may occur, said turbulences advancing in axial direction, rather than in short eddy currents. The latter may impair the cross section of the filament or fibre formed. For the same reason, the nozzle body may be designed, in accordance with the invention, in such a manner that each nozzle channel over its axial length, including the joining areas, has a wider free cross section in the zone in front of the nozzle end. The term "zone in front of the nozzle end" is to be understood as meaning the axial zone of the nozzle channel in front of the nozzle end which possesses a cross section as uniform as possible over the entire length and a wall as smooth as possible, so that the flow of the spinning material in front of the nozzle end becomes uniform. As a result of this, a uniform and continuous strand of material is obtained.

These and other objects and advantageous features of this invention will be apparent from the following detailed description and drawings, appended thereto, wherein merely for the purpose of disclosure non-limitative embodiments of the invention are set forth.

In the drawings:

FIGURE 1 is a longitudinal section through a spinning nozzle tip with built-in three-stage nozzle bodies;

FIGURE 2 is a longitudinal section through a three-stage nozzle body inserted in the spinning nozzle tip according to FIGURE 1;

FIGURE 2a is a cross section through the nozzle body taken on the line a—a of FIGURE 2; in the direction of the arrows;

FIGURE 2b is a cross section through the nozzle body taken on the line b—b of FIGURE 2 in the direction of the arrows;

FIGURE 3 is a longitudinal section, on a considerably enlarged scale, through a part of the spinning nozzle tip, according to FIGURE 1, at the zone of the feed chamber for the innermost nozzle;

FIGURE 4 is a longitudinal section through a similar part of the spinning nozzle tip, according to FIGURE 1, in the zone of the feed chamber for the central nozzle, on the same scale as FIGURE 3;

FIGURES 5 to 7 are partial cross sections, on enlarged scale, of the spinning nozzle tip in three assembling stages;

Figure 29:
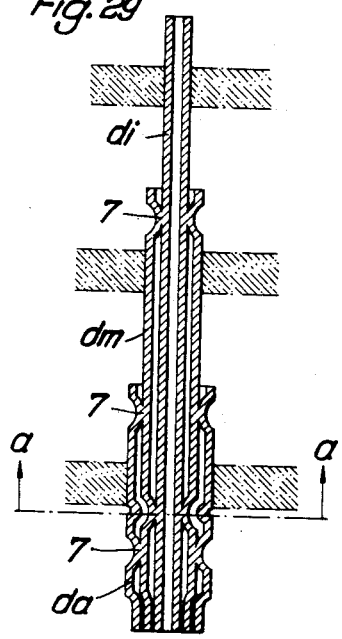
Figure 32:
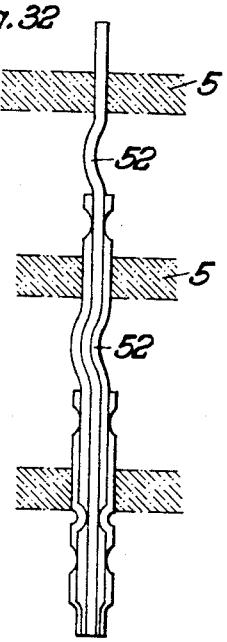
Figure 30:
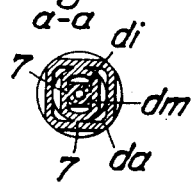
Figure 31:
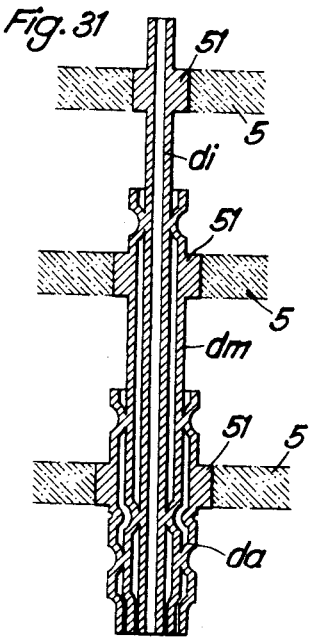
Figure 33:
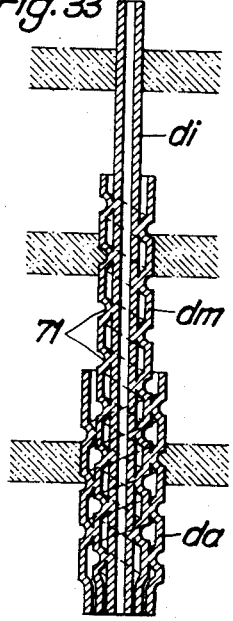

FIGURES 8 and 9 longitudinal sections of a modified embodiment of a three-stage nozzle prepared in two assembling stages;

FIGURES 10 to 19 are longitudinal sections through an embodiment of a three-stage nozzle body similar to that of FIGURE 2 showing different manufacturing stages;

FIGURE 13a is a cross section taken on line c—c of FIGURE 13 in the direction of the arrows;

FIGURE 13a' is a cross section taken on line d—d of FIGURE 13';

FIGURE 20 is a schematically longitudinal section through an electrolyzer apparatus used in the manufacture of nozzle bodies according to the invention;

FIGURES 21 to 26 are longitudinal sections through a modified embodiment of a three-stage nozzle body at different manufacturing stages;

FIGURE 27 is a longitudinal section through a spinning nozzle tip, according to the invention, with built-in three-stage nozzle bodies, and taken on line b—b of FIGURE 28;

FIGURE 28 is a cross section through the spinning tip taken on the line a—a of FIGURE 27;

FIGURE 29 is a longitudinal section through a spinning nozzle tip;

FIGURE 30 is a cross section taken on line a—a of FIGURE 29 in the direction of the arrows;

FIGURE 31 is a longitudinal section through another embodiment of the spinning nozzle tip;

FIGURE 32 is a longitudinal section through a still further modified spinning nozzle tip;

FIGURE 33 is a longitudinal section of a further modification of the spinning nozzle tip;

FIGURE 34 is a longitudinal section of a still further embodiment of a spinning nozzle tip taken on line d—d of FIG. 35; and FIGURE 35 is a cross section taken on the line c—c of FIGURE 34.

First, the manufacture of a multi-stage body which is of particular importance for practicing the invention will be described in the following.

A section through an embodiment of such three-stage nozzle body, according to the invention, is schematically shown in FIGURES 2, 2a and 2b and which is made of hard gold. The inner nozzle tube Di has the greatest length and is surrounded by a slightly shorter intermediate nozzle tube Dm which, as shown in FIGURE 2a, is integrally joined to the inner nozzle tube Di, at least at one level. The intermediate tubular nozzle Dm is surrounded by an outer ring nozzle Da which, in turn, is shorter than the intermediate nozzle tube Dm and is joined integrally therewith, as shown in FIGURE 2b, at least at one level. In the embodiment illustrated in FIGURE 2b, the intermediate nozzle Dm and the inner nozzle Di are connected with one another at two places which are radially displaced 90° with respect to the joint shown in FIGURE 2a. The free opening of the nozzles depends on the desired cross section of the spinning product. Useful textile fibres are made, for example, by means of nozzles in which the inner nozzle has an opening of 10μ, a material diameter of 10μ, and the two outer nozzles each have an annular width of 20μ and also a material diameter of 20μ.

A method for manufacturing such three-stage nozzle bodies will be described with reference to FIGURES 10 to 19, whereby the layers are exclusively applied electrolytically. Consequently, in this case, only metallic material can be used.

Copper or silver are used as auxiliary material which is removed during the manufacture of the nozzle, while as structural material for the nozzle body hard gold (750 parts of Au and 250 parts of Ag) are employed.

In place of hard gold, rhodium or hard chromium have been used successfully. According to FIGURE 11, a hard gold layer 11 with a thickness of 10μ is electrolytically applied to a copper or silver wire 10, FIG. 10, having a diameter of 10μ. The electrolyzer apparatus and the electrolysing method will be described with reference to FIGURE 20. The hard gold layer is covered by an electrolytically applied copper or silver layer 12, FIG. 12, having a thickness of 20μ. The soft metal layer 12 which was applied in the last step and preferably also some parts of the hard metal layer 11 underneath the layer 12 are now removed in form of segments by cutting tools, such as grinding wheels, milling tools, drills, etc. at certain zones in dependence on the longitudinal dimension of the final nozzle body. As a result thereof, a round notch or a notch having corners is produced, as shown in FIGURES 13, 13a, 13' and 13a'. Thus, the hard metal layer 11 is exposed at the recessed points 13 and 13'. A further annular layer 14, FIG. 14, of hard metal having a thickness of about 20μ is galvanically applied, said layer integrally joining with the inner hard metal layer 11 at the recessed points 13. Therefore, the intermediate product according to FIGURE 14 has at the recessed points a cross section which is shown in FIGURE 2a.

In the next step, the upper part of the incomplete nozzle product obtained, as shown in FIGURE 15, is provided with a non-metallic layer 15 below the joint of the hard metal layers, said layer 15 being stable against the electrolyzing liquid and may consist of a lacquer. A soft metal layer 16 of an annular thickness of 20μ is then electrolytically applied to the part of the hard metal layer 14 which was left free, FIG. 16, and this layer is removed in the form of segments at a zone at the level 17, FIG. 17, determined by the desired height of the outer nozzle. Such operation has been described with respect to the recess 13 with reference to FIGURES 13, 13a, 13' and 13a'.

Thereafter, the last or outer annular nozzle layer 18, FIG. 18, is applied to a thickness of about 20μ.

The nozzle body with all its layers obtained by electrolytic steps is shown complete in FIGURE 19. The nozzle body is cut by means of a precision lathe with the aid of a micrometrically adjustable cutting tool, for example, a lathe tool or a turning diamond, at the points 19 and 20, until a certain depth is obtained. The cutting depth at 19 is dimensioned in such a manner that the lacquer layer 15 and the hard metal layer 14 are completely cut, while the innermost hard metal layer 11 is not penetrated. This step can be carried out without any difficulties, since the soft metal layer 12 is located between the hard metal layers 14 and 11.

At the cutting point 20, only the outermost hard metal layer 18 is cut, while the two other hard metal layers 14 and 11 remain uncut. Also here, the soft metal layer 16, between the hard metal layers 18 and 14, serves as a safety zone for the cutting tool.

Subsequently, the nozzle body is machined to the proper size for assembling by cutting, sawing, or turning at 21 and 22, and is then chemically treated to dissolve the protective layer 15 and all of the soft metal material, that is the layers 10, 12 and 16 are dissolved. A boiling 65% nitric acid solution has proven suitable for this purpose.

By means of the vapor developed in the boiling solvent and, if necessary, by application of a vacuum, care is exercised that fresh solvent enters the nozzle chambers continuously, said chambers becoming gradually deeper and deeper during the dissolving operation.

Thus, the nozzle body, comprising the three nozzle tubes $Di$, $Dm$ and $Da$ ready to be applied, is produced, as shown in FIGURE 2.

A modified method for manufacturing a three-stage nozzle is illustrated in FIGURES 21 to 25, inclusive, or 26. As indicated in the foregoing, the principle of this method of manufacture lies in that the individual nozzle stage bodies are made separately from one another and are combined to a spinning nozzle assemblage when built in. The innermost nozzle body $Di$ comprises a core 61 of nickel wire of, for example, $10\mu$ diameter, and a tubular sleeve 62 of hard metal of about $10\mu$ thickness. The intermediate nozzle body $Dm$, FIGURE 22, comprises a core member 63 of silver wire, the thickness of which corresponds practically to the outer diameter of the inner nozzle body 61 and 62, that is to $30\mu$. The silver wire 63 is first covered with a hard chromium layer 64 of about $1\mu$ and, thereafter, with a nickel film 65 of, for example, $20\mu$. In the same way as in the embodiment of FIGURE 13, the nickel layer will be provided with notches 66 extending to the separating layer 64. The actual intermediate nozzle tube 67, comprising a rare metal layer of about $20\mu$, is applied to the joined core 63, 64 and 65. Thus, the intermediate nozzle tube has an outer diameter of about $112\mu$. The outer nozzle body $Da$, FIGURE 23, will be made in the same way as the intermediate nozzle body, that is of a silver wire core 68 of about $112\mu$ thickness, a separating hard chromium film 69 of about $1\mu$ thickness, a nickel layer of $20\mu$ thickness forming the outer core sleeve 70 and the actual nozzle tube 72 which retracts inwardly into the nickel layer 70 at the notches 71.

The nozzle bodies $Di$, $Da$ and $Dm$ are first made in suitable lengths, preferably cut from longer tubular pieces and their edges are rounded. The silver wire cores are then removed from the bodies $Dm$ and $Da$, FIGURES 22 and 23, by anodic electrolysis in an alkaline cyanide bath, whereupon the nozzle bodies are placed within one another, as shown in FIGURE 24. Such multi-stage nozzle members, consisting of solid material except for the small notches at 66 and 71, are then inserted into a spinning nozzle body and, subsequently, the nickel layers 61, 65 and 70 are removed therefrom by 65% nitric acid. The raw nozzle members have then the form shown in FIGURE 25, in which the spinning nozzle body is omitted, whereby the lower front surfaces of the three nozzle tubes lie in a common plane. However, the individual nozzle tubes may be assembled in such a manner that they end at different levels, as shown in FIGURE 26. This or a similar kind of nozzle arrangement may be practical in certain spinning methods.

FIGURE 1 of the drawing illustrates an embodiment of a supporting body according to the invention, said body having an axially symmetrical construction and being made of acid resistant chromium nickel steel. The spinning tip constitutes a supporting body 23, comprising four parts, three rings 24 and a distributor top member 25. The supporting body 23 comprises four rotational elements $23b$ to $23e$ of conical longitudinal configuration, said elements being fitted into one another. The innermost body $23b$ is a solid cone, while the outer bodies $23c$ to $23e$ have the shapes of hollow cones.

Three channels $23i$, $23m$ and $23a$, FIGURE 1, are formed between the four cone bodies, said channels serving as supply conduits for the spinning material. The four cone bodies are preferably shrunk on one another and their mutual position is fixed by means of spacer pins 26. The ring channels $23i$, $23m$ and $23a$ end on the outside of the supporting body 23 in tangentially formed ring grooves of semicircular cross section. A plurality of grooves, each running in the direction of one generatrix, is distributed around the circumference of the supporting body 23, each of said grooves serving to receive one of the nozzle bodies D of multi-stage design, described in the foregoing. Suitable annular channels, also of semicircular cross section, are provided on the inner side of the ring 24. In this way, it is possible to secure a plurality of multi-stage nozzle bodies to the circumference of the supporting body 23.

The structure of the innermost nozzle $Di$ is shown in FIGURE 3 on a considerably enlarged scale, while the intermediate nozzle $Dm$ is illustrated in FIGURE 4 on the same enlarged scale.

FIGURES 5 to 7 show, likewise, on an enlarged scale, the assembling steps of a nozzle body. The nozzle body D is surrounded by a cement layer 27 at the zone between two inner channel openings, that is practically at the zone of the recesses described in the foregoing of the outer nozzle sleeve, said cement layer consisting of a phosphate cement as used in dentistry. The nozzle body D is then inserted into the sleeve notch of the supporting body 23 with the aid of a knife-shaped tool 28. The cement mass extending beyond the sleeve of the supporting body 23 is then cut off, preferably, by means of a part of the sleeve body 23, and the rings 24 are shrunk thereon. The amount of the cement layer is selected in such a manner that the mentioned recesses of circular cross section around the inner nozzle openings $Di$, $Dm$ and $Da$ are not obstructed. To prevent the nozzles from being clogged with cement rests, etc., when the nozzle body is inserted or assembled, the nozzles are preferably closed by means of a chemically readily destructible cover 29, FIGURE 8, for example, of a lacquer. These closing laquer covers are removed after finishing of the spinning tip by means of suitable solvents or chemical decomposition.

As shown in FIGURES 3 and 4, the admission opening of each of the nozzle tubes is arranged approximately at the center of the annular channel of the circular cross section. As a result thereof, a circular flow is obtained during feeding of the spinning material to prevent, to a great extent, the clogging of the narrow nozzle tubes, due to impurities in the spinning mass, as well as damming up of the material which would impair the structure of the product. A further advantage of the annular channel is that the nozzle openings do not have to be precisely arranged in the plane of the feed lines $23i$, $23m$ or $23a$.

As illustrated in FIGURES 1 and 27, the nozzle bodies D at the discharge side may extend beyond the closure surface of the supporting body 23 to avoid that the spinning material discharging from the outer nozzle $Da$ adheres to the front surface of the spinning tip and to avoid irregularities in the fibre caused thereby. However, if the outer nozzle is charged with a gas or a liquid of a type which does not form fibres, the nozzle tips do not have to extend beyond the front side of the spinning tip.

Preferably, the finished nozzle body D, prior to its insertion in the supporting body 23, is filled with a mechanically strong substance which can be readily removed, for example, a synthetic material or a metal adapted to be destroyed by acids, so as to avoid crushing of the nozzle body which is in an unstable condition with respect to its form during the assembly with the supporting body.

The cement layer 27 may consist of a metal adapted to be applied electrolytically.

FIGURES 8 and 9 show how such metallic cement mass can be obtained, said mass consisting of a porous, thick gold layer. In the same manner as in the previous example, covers 29 of a lacquer are first applied to the nozzle body D at the zones of the inner nozzle ends, and the remaining free portions of the metallic exterior are then provided with soft gold flanges 30 by an electrolytic operation. The polishing required in the known manufacture of hard metal bodies between successive electrolysing steps can be practically omitted, because the porosity of the soft gold layer is not disturbing. The nozzle bodies, thus prepared, are assembled in the same manner as described in the foregoing, for bodies covered by cement layers between the supporting body 23 and the rings 24.

The distributor top member 25, FIG. 1, described in the foregoing, is provided with feed lines 31 and ring-shaped, milled cavities 32 terminating into the annular channels 23$i$, 23$m$ or 23$a$, respectively, after the distributor top member 25 has been placed on the supporting body 23. The top member 25 and the body 23 are preferably joined by means of flanges.

A simple electrolyzer apparatus is schematically illustrated in FIGURE 20, in which the copper and silver wire ends mentioned in the foregoing and serving as innermost auxiliary core 10 are soldered in a metallic holding member 32 which has an annular seating flange. Several of such holding members 32, holding wire elements 10, are inserted in a perforated plate 33 placed on a yoke-shaped cathode 34. The material to be electrolytically deposited forms anodes 35. The electrolysis is advantageously interrupted at certain periods and the layer thus formed is condensed by means of corundum and/or diamond dust and polished to obtain a bright lustre. A removal of grease, if this should be necessary, may be carried out in a known manner with the aid of a potassium cyanide solution. Obviously, the polishing and layer-condensing step may be carried out by treating the wires which are temporarily to be removed from their holding members 32 in drums or roller apparatus. It is furthermore possible to prepare by suitable treatment in electrolytic baths the hard metal layers contacting the soft metal layers, said hard metal layers presenting the surfaces engaged by the spinning materials in the finished nozzle body, as extremely hard but very thin film layers, for example, of iridium.

Continuously operating devices may be successfully employed in place of the simple and periodically operating apparatus described in the foregoing.

In accordance with the invention, the supporting body 23 and distributor top member 25 may be made of other material than metal, particularly, of organic material. Of course, a material has to be selected which is chemically inactive in the presence of the spinning substance contacted thereby, and in case of a gaseous spinning substance, required for obtaining hollow fibers, such inactive property is inherent.

The invention is not limited to multi-stage nozzles with concentric arrangement of the individual nozzle stages, but also relates to nozzles with eccentrically arranged individual nozzles. In accordance with the invention, a nozzle stage may comprise a plurality of nozzle bodies. Particularly, the innermost nozzle stage can be made by simultaneously enclosing a plurality of core filaments.

Experience has shown that, in the case of the manufacture of spinning fibers having cores of a lower body resistance or higher compressibility than the surrounding layer, at least at the instant of their formation, which is true for hollow fibers, it is preferable to maintain a flow resistance in the nozzle tube supplying the core substance, whereby the value of this flow resistance exceeds by far the back pressure forces exerted by the outer sleeve at the nozzle end. In the case of the simplest embodiment, the inner nozzle tube is made very long and narrow.

The spinning nozzle tip, shown in FIGURE 27 and in cross section in FIGURE 28, comprises as main parts the supporting members $ti$, $tm$, $ta$, $tk$ and a plurality of three-stage nozzles $d$ of the same design.

These supporting members have such shape that they engage one another, in accordance with the invention. The two central supporting members $tm$ and $ta$ are practically of the same configuration. A central recess 1 is provided on the bottom of each of these two central supporting members, said recess comprising a flat central portion bordered by a conically-shaped or outwardly flaring side wall and an adjacent annular flange 2, projecting from the bottom surface. A central plug 3 is provided on the top of each of these supporting members, this central plug being surrounded by an annular groove 4. The outer diameter of the plug 3 equals the inner diameter of the bottom recess 1 and the cross section of the annular groove 4 corresponds to the cross section of the bottom flange 2 with such precision, that these parts engage one another with a snug fit.

The depth of the annular grooves 4 is larger than the height of the annular flanges 2, so that gaskets 5 can be provided in the grooves 4. The top of the upper supporting member $ti$ is flat and only its bottom has the recess 1 and the annular flange 2. Only the top of the lower supporting member $tk$ is provided with the central plug 3 and the annular groove 4, while, generally, its bottom is flat. In the example illustrated in FIGURE 27, this bottom has an extended, flat, recessed portion 6 from which the ends of the nozzles $d$ project.

The multi-stage nozzles $d$ are of the same construction as for example shown in FIGURE 29. The inner nozzle tube $di$ has the greatest length, and it is surrounded by a somewhat shorter, intermediate annular nozzle tube $dm$. The latter in turn, is surrounded by a still shorter outer annular nozzle $da$. The lengths of these individual nozzle tubes $di$, $dm$ and $da$ are selected with respect to the dimensions of the supporting members $ti$, $tm$, $ta$ and $tk$, FIGURE 27, so that the upper ends of these nozzle tubes, respectively, extend in the zones of the recesses 1 which are assigned to them. The supporting members have suitably arranged bores for the passage of the nozzle tubes, whereby, likewise, care has to be taken for snug fit.

These nozzle tubes, as shown in the foregoing examples, are integrally joined at least at one level, so that their predetermined mutual alignment can be maintained even if the tubes are subjected to mechanical stresses during the assembling of the nozzle top. Such integral joining places are indicated at 7 in FIGURE 29.

According to FIGURE 27, the spinning nozzle top is assembled in such a manner that the nozzles are inserted in such a manner that the nozzles are inserted in the lowest supporting member $tk$ and then step by step one gasket 5 and one further supporting member $ta$, $tm$ or $ti$, are placed over the nozzle tubes until the block, as illustrated, is produced. Thereafter, the clamping spindles 8 are inserted and uniformly tightened in the usual manner. Thus the gaskets 5, of deformable, suitably chemically resistant material, for example, soft gold, lead, or the like, are plastically or resiliently deformed, whereby they penetrate as far as possible into the small annular gaps between the inter-engaging supporting parts, so that an absolute seal is obtained. It is possible to apply preliminary pressure to a previously inserted upper gasket by means of a device after each assembly of a supporting member to possibly prevent longitudinal buckling of the nozzle tubes. When the clamping spindles are tightened at the completion of the assembly step, the longitudinal displacements obtained are rather small.

In place of a preformed gasket, unshaped sealing material of such nature may be introduced in the sealing groove after the mounting of a supporting member on the nozzle group so that the sealing material will form a mass filling the sealing chamber without pores or gaps, at least, when the spinning nozzle top is tightened. The sealing material may, for example, be introduced in molten condition. The use of unshaped sealing material is primarily advantageous if the spinning top has multi-core nozzles which are close to one another. It is possible to melt or fuse previously assembled, coarsely apertured "tablets" to obtain suitable gaskets.

The spinning nozzle shown in FIGURE 31 differs from that of FIGURE 29 in that the nozzle tubes $di$, $da$ and

*dm*, when assembled always lie with their zones 51 in the areas of the gasket 5, and have a greater wall thickness, thus increasing the radial pressure resistance of this zone, which is highly mechanically stressed. The wall thickness is increased by an additional, for example, an electrolytic metal layer. The special feature of the spinning nozzle shown in FIGURE 32 consists in that the portions of the nozzle tubes at the zones 52 between two gaskets 5 are slightly curved. These curved portions act like the usual equalizing tubes known in the pipe technique, i.e., they yield to axial forces by increasing or decreasing their curve radius, while correspondingly enlarging or shortening the tube portion mounted between the gaskets 5.

FIGURE 33 shows an embodiment of a multi-stage nozzle which has an important feature, which is the firm positioning of the telescoped nozzle tubes *di*, *da* and *dm* by providing their integral joints in the form of a continuously running helical rib 71. The structural and manufacturing advantages obtained thereby have been mentioned in the foregoing.

The characteristic of the spinning nozzle embodiment shown in FIGURES 34 and 35 consists in symmetrically assembling three core nozzle tubes *di'* within a triangularly shaped intermediate annular nozzle tube *dm'* which, in turn, is surrounded by an outer annular nozzle tube *da'*, also of triangular cross section. These nozzle tubes *di'*, *dm'* and *da'* are, likewise, integrally interconnected at spaced joints 72, FIGURE 34.

The term "zone in front of the nozzle end" which is used to characterize the invention, refers to the zone *dv* of the spinning nozzle shown in FIGURE 34, this zone, with reference to the current direction of the spinning material, lying in front of the discharge plane M of the spinning nozzle and consisting of tube portions having smooth walls. The free cross sections of these tube portions are always smaller than the free cross sections of the corresponding nozzle tubes, including the narrow passages at the integral joints. The zone *dv* has to be exactly centered and is not permitted to lose this quality if the lowest gasket is compressed. Therefore, the lowest zone of joints has to be suitably designed and has to be made pressure resistant, for instance by providing multiple joints, preferably at all tube stages.

As shown in FIGURE 27, the axial lengths of the central recesses 1 of the supporting members *ti*, *tm* and *ta* are greater than the plugs 3 projecting into the recesses of the supporting members *tm*, *ta* and *tk*, located therebelow. As a result of this, hollow spaces *s* are produced when pairs of two of the supporting members *ti/tm*, *tm/ta*, and *ta/tk*, are assembled, said hollow spaces serving as feeding chamber for the respective nozzle tube *di*, *dm* and *da*. In order to obtain a circulating current in the spinning material in the admission zone of the nozzle tube mentioned in a foregoing embodiment, the recess 1 has to be suitably shaped and ends, for example, by means of a short and narrow channel *sk* in an annular channel *sr* of nearly circular cross section. The upper ends of the nozzle tubes *di*, *dm* and *da* extend into this channel *sr*. The annular channel *sr* may be obtained, for example, by casting or sintering. If the parts are produced on a lathe, the supporting members are preferably made of two fitting, conically shaped, individual members having cone surfaces ground on one another.

Passages *Zi*, *Zm* and *Za*, FIGURE 27, are provided within the supporting members with feed openings at the sides thereof to supply the spinning material to the feed chambers.

The foregoing description of some preferred embodiments does not limit the invention to these embodiments which are merely illustrated and described for the better understanding of the invention.

We claim:

1. Multiple-hole spinning nozzle comprising spinning nozzle bodies having feed chambers for spinning liquids provided adjacent one another in axial direction of the nozzle to produce composite or hollow fibers at the spinning nozzles, connecting bridges in the feed chambers, said multiple nozzle bodies being built into and sealed in the bridges said spinning bodies having nozzle tubes telescoped into one another and ending at one end in a substantially common discharge plane which is the plane of the nozzle end, and at the other end in the respective feed chambers, whereby said nozzle tubes are integrally joined at least at one intermediate zone by a connecting bridge, to the nozzle bodies being sealed in a supporting body comprising a plurality of parts forming the feed chambers and substantially concentrically arranged parts as a central main body and a sleeve body composed of a plurality of parts, whereby conduits supplying the spinning material to the various feed chambers are located in said main body.

2. Multiple-hole spinning nozzle comprising spinning nozzle bodies having feed chambers for spinning liquids provided adjacent one another in axial direction of the nozzle to produce composite or hollow fibers at the spinning nozzles, connecting bridges in the feed chambers, said multiple nozzle bodies being built into and sealed in the bridges, said spinning bodies having nozzle tubes telescoped into one another and ending at one end in a substantially common discharge plane which is the plane of the nozzle end, and at the other end in the respective feed chambers, whereby said nozzle tubes are integrally joined at least at one intermediate zone by a connecting bridge, the nozzle bodies being sealed in a supporting body comprising a plurality of parts forming the feed chambers, and a plurality of similar parts arranged adjacent one another in axial direction forming free spaces therebetween serving the feed chambers.

3. A multi-hole spinning nozzle comprising a supporting body in the form of a plurality of similar parts arranged adjacent one another in axial direction relative to the nozzle and providing free spaces between them serving as feed chambers, said nozzle comprising plural nozzle bodies sealed therein, the nozzle tubes of said nozzle bodies telescoping into one another ending at one end in a common discharge plane and at the other end ending in their respective feed chambers and being integrally joined at, at least, one part located therebetween.

4. A spinning nozzle according to claim 3, in which the supporting parts interengage snugly, at least, at one part of the nozzle tube, and enclose at this part of engagement a deformable gasket between said supporting parts.

5. A spinning nozzle according to claim 3, in which the nozzle bodies are helical so that they are resilient in longitudinal direction at the part between two axially successive gaskets.

6. A spinning nozzle according to claim 3, in which the nozzle bodies are curved so that they are resilient in longitudinal direction at the part between two axially successive gaskets, the nozzle bodies being provided with widened portions at the outer wall at the zones of each gasket.

7. A spinning nozzle according to claim 3, in which the engaging parts between the nozzle tubes are combined to form a helical rib running in axial direction.

8. A spinning nozzle according to claim 3, in which the nozzle bodies are designed so that each nozzle channel, along its axial length including the joining zones, has a wider free cross section than at the zone in front of the end of the nozzle.

9. A spinning nozzle according to claim 13, in which said zone of interconnection having the form of a depression in said material forming the other channel wall.

10. Multiple-hole spinning nozzle comprising a plurality of spinning nozzle bodies, at least three feed chambers for spinning materials provided adjacent one another in axial direction of the nozzle to produce composite and hollow filaments with the aid of said spinning nozzle bodies and partition walls between said feed chambers, said nozzle bodies being built into and sealed into said partitions to form individual connections between each feed chamber and each nozzle channel.

11. Multiple-hole spinning nozzle according to claim 10, in which the nozzle bodies are sealed in a supporting body comprising a plurality of parts forming the feed chambers.

12. Multiple spinning nozzle according to claim 10, in which one of the inner nozzle channels has a limited lumen, the limitation being adapted to create a flow resistance against the spinning material fed therethrough and considerably exceeding the external forces exerted upon said spinning material at said nozzle orifice when spinning.

13. A spinning nozzle comprising a metallic body provided with a central channel and at least one annular channel concentric with said central channel, said channels ending at one end in a substantially common discharge plane as a nozzle orifice and at the other end in axially staggered distances from one another with smooth wall surfaces, the annular space surrounded by the walls of said channels being of substantially constant cross section along the axial channel extension and traversed by metallic material at radially restricted places within the inner region of an axially comparably extended annular nozzle channel and having unstressed molecular structure, said traverse material interconnecting therewith being part of the material forming one channel wall and closely engaging by laminar surface areal contact with the material forming the other channel wall at the zone of interconnection therewith at the restricted locations.

References Cited in the file of this patent
UNITED STATES PATENTS

| | | |
|---|---|---|
| 876,755 | Webb | Jan. 14, 1908 |
| 1,590,598 | Taylor | June 29, 1926 |
| 1,604,216 | Brainin | Oct. 26, 1926 |
| 1,654,936 | Jones | Jan. 3, 1928 |
| 1,859,901 | Trebes | May 24, 1932 |
| 2,269,459 | Kleist | Jan. 13, 1942 |
| 2,360,680 | Holzmann | Oct. 17, 1944 |
| 2,408,398 | Johnson | Oct. 1, 1946 |
| 2,703,433 | Holzmann | Mar. 8, 1955 |
| 2,710,987 | Sherman | June 21, 1955 |
| 2,742,667 | Clouzeau | Apr. 24, 1956 |
| 2,790,202 | Lorenian | Apr. 30, 1957 |
| 2,808,617 | Terracini et al. | Oct. 8, 1957 |

FOREIGN PATENTS

| | | |
|---|---|---|
| 878,935 | France | Nov. 2, 1942 |
| 997,210 | France | Jan. 3, 1952 |

OTHER REFERENCES

"Rayon and Textile Monthly," February 1936 (page 53 relied on).